US012738055B2

(12) United States Patent
Rao et al.

(10) Patent No.: US 12,738,055 B2
(45) Date of Patent: Sep. 15, 2026

(54) IMAGE SCENE RECOGNITION METHOD AND APPARATUS

(71) Applicant: SHANGHAI BILIBILI TECHNOLOGY CO., LTD., Shanghai (CN)

(72) Inventors: Cong Rao, Shanghai (CN); Xinbo Wang, Shanghai (CN); Ziyi Shen, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 299 days.

(21) Appl. No.: 18/688,741

(22) PCT Filed: Jun. 16, 2022

(86) PCT No.: PCT/CN2022/099269
§ 371 (c)(1),
(2) Date: Mar. 1, 2024

(87) PCT Pub. No.: WO2023/029665
PCT Pub. Date: Mar. 9, 2023

(65) Prior Publication Data

US 2024/0290092 A1 Aug. 29, 2024

(30) Foreign Application Priority Data

Sep. 2, 2021 (CN) ......................... 202111026055.6

(51) Int. Cl.
*G06V 20/00* (2022.01)
*G06V 10/762* (2022.01)
*G06V 10/764* (2022.01)

(52) U.S. Cl.
CPC ............ *G06V 20/35* (2022.01); *G06V 10/762* (2022.01); *G06V 10/764* (2022.01)

(58) Field of Classification Search
CPC ........ G06V 20/35; G06V 20/00; G06V 20/41; G06V 10/762; G06V 10/764; G06V 10/774; G06V 10/82
See application file for complete search history.

(56) References Cited

U.S. PATENT DOCUMENTS

2015/0286638 A1 10/2015 Li et al.
2019/0129432 A1* 5/2019 Russell ................ B60W 40/04
(Continued)

FOREIGN PATENT DOCUMENTS

CN 102930246 A * 2/2013
CN 103366181 A 10/2013
(Continued)

OTHER PUBLICATIONS

Translated version of CN 111597921 (Year: 2020).*
(Continued)

*Primary Examiner* — Carol W Chan
(74) *Attorney, Agent, or Firm* — BakerHostetler

(57) ABSTRACT

This application provides an image scene recognition method and apparatus. The image scene recognition method includes: obtaining a to-be-recognized image, inputting the to-be-recognized image into a target visual element detection model and determining at least one target visual element comprised in the to-be-recognized image by the target visual element detection model, and inputting the at least one target visual element into a scene recognition model and generating a scene category corresponding to the to-be-recognized image by the scene recognition model. In this way, a bottom-up scene recognition method is used to infer, based on microscopic visual elements, a macroscopic scene category in which the microscopic visual elements may coexist,
(Continued)

thereby implementing scene recognition, and greatly improving recognition precision and accuracy during image scene recognition.

20 Claims, 6 Drawing Sheets

(56) References Cited

U.S. PATENT DOCUMENTS

| | | | | |
|---|---|---|---|---|
| 2019/0156122 | A1* | 5/2019 | Lu | G06V 10/761 |
| 2021/0406525 | A1* | 12/2021 | Fan | G06F 18/2193 |
| 2022/0058429 | A1* | 2/2022 | Zou | G06V 10/454 |

FOREIGN PATENT DOCUMENTS

| | | | |
|---|---|---|---|
| CN | 103679189 | A | 3/2014 |
| CN | 108710847 | A | 10/2018 |
| CN | 111539353 | A | 8/2020 |
| CN | 111597921 | A | 8/2020 |
| CN | 112052911 | A | 12/2020 |
| CN | 112204565 | A | 1/2021 |
| CN | 113033507 | A | 6/2021 |
| WO | WO 2020/186914 | A1 | 9/2020 |

OTHER PUBLICATIONS

International Patent Application No. PCT/CN2022/099269; Int'l Search Report; dated Sep. 14, 2022; 2 pages.

China Patent Application No. 202111026055.6; Office Action; dated Dec. 23, 2025; 13 pages.

* cited by examiner

IMAGE SCENE RECOGNITION METHOD AND APPARATUS

CROSS-REFERENCE TO RELATED APPLICATIONS

This application is the U.S. National Stage of International Application No. PCT/CN2022/099269, filed on Jun. 16, 2022, which claims priority to Chinese Patent Application No. 202111026055.6, filed on Sep. 2, 2021, and entitled "IMAGE SCENE RECOGNITION METHOD AND APPARATUS", both of which are incorporated herein by reference in their entireties.

TECHNICAL FIELD

This application relates to the field of image processing technologies, and in particular, to an image scene recognition method. This application also relates to an image scene recognition apparatus, a computing device, a computer-readable storage medium, and a computer program product.

BACKGROUND

With rapid development of computer technologies and Internet technologies, images as propagation media are increasingly loved by people. Many aspects of people's work and life involve image understanding, and a primary task for image understanding is to perform scene recognition. Scene recognition is a technology for implementing a human visual function by using a computer. An objective of scene recognition is to enable the computer to process an image and automatically recognize a scene in the image. With development of deep learning, it is increasingly common to use a trained image recognition model to resolve a scene recognition problem.

In the conventional technology, a top-down recognition method is usually used for conventional scene recognition, and a macroscopic global feature in an image is automatically learned by using a classifier, to implement a scene recognition function. For example, in a current scene recognition method, a convolutional neural network is often used to simultaneously learn global feature extraction and scene classification in an image, so that the convolutional neural network can analyze an input image and output a scene category of the image, namely, an end-to-end scene recognition method.

However, in the foregoing end-to-end scene recognition method, an input is an image on which scene recognition needs to be performed, and a recognized scene is directly output. When scene recognition is performed on the image, only a macroscopic global feature of the image is paid attention to, resulting in limited recognition precision and accuracy during image scene recognition.

SUMMARY

In view of this, embodiments of this application provide an image scene recognition method. This application also relates to an image scene recognition apparatus, a computing device, a computer-readable storage medium, and a computer program product, to resolve a technical problem in the conventional technology that recognition precision and accuracy are low during image scene recognition.

According to a first aspect of the embodiments of this application, an image scene recognition method is provided, including:

obtaining a to-be-recognized image;

inputting the to-be-recognized image into a target visual element detection model to obtain at least one target visual element included in the to-be-recognized image; and inputting the at least one target visual element into a scene recognition model to obtain a scene category corresponding to the to-be-recognized image.

According to a second aspect of the embodiments of this application, an image scene recognition apparatus is provided, including:

an obtaining means, configured to obtain a to-be-recognized image;

a first input means, configured to input the to-be-recognized image into a target visual element detection model to obtain at least one target visual element included in the to-be-recognized image; and a second input means, configured to input the at least one target visual element into a scene recognition model to obtain a scene category corresponding to the to-be-recognized image.

According to a third aspect of the embodiments of this application, a computing device is provided, including:

a memory and a processor, where the memory is configured to store computer-executable instructions, and the processor is configured to execute the computer-executable instructions to:

obtain a to-be-recognized image;

input the to-be-recognized image into a target visual element detection model to obtain at least one target visual element included in the to-be-recognized image; and input the at least one target visual element into a scene recognition model to obtain a scene category corresponding to the to-be-recognized image.

According to a fourth aspect of the embodiments of this application, a computer-readable storage medium is provided. The computer-readable storage medium stores computer-executable instructions. When the computer-executable instructions are executed by a processor, steps of any image scene recognition method are implemented.

According to a fifth aspect of the embodiments of this application, a computer program product is provided. When the computer program product is executed in a computer, the computer is enabled to perform steps of any image scene recognition method described above.

According to the image scene recognition method provided in this application, the to-be-recognized image can be first obtained, then the to-be-recognized image is input into the target visual element detection model, a sub-model of a machine learning model, to obtain the at least one target visual element, and then the at least one target visual element is input into the scene recognition model, another sub-model of the machine learning model, to obtain the scene category corresponding to the to-be-recognized image. In this case, the to-be-recognized image may be first recognized to obtain microscopic visual elements in the to-be-recognized image, then the microscopic visual elements are input into the scene recognition model, and a macroscopic scene category in which the microscopic visual elements may coexist is inferred by using the scene recognition model. In this way, the scene category of the to-be-recognized image is recognized. Therefore, overall macroscopic global feature extraction and analysis are not performed on an image on a top-down basis, but a bottom-up scene recognition method is used. In this way, the macroscopic scene category in which the microscopic visual elements may coexist is inferred based on the microscopic visual elements, thereby implementing scene recognition, and greatly improving recognition precision and accuracy during image scene recognition.

DESCRIPTION OF EMBODIMENTS

Figure 1:
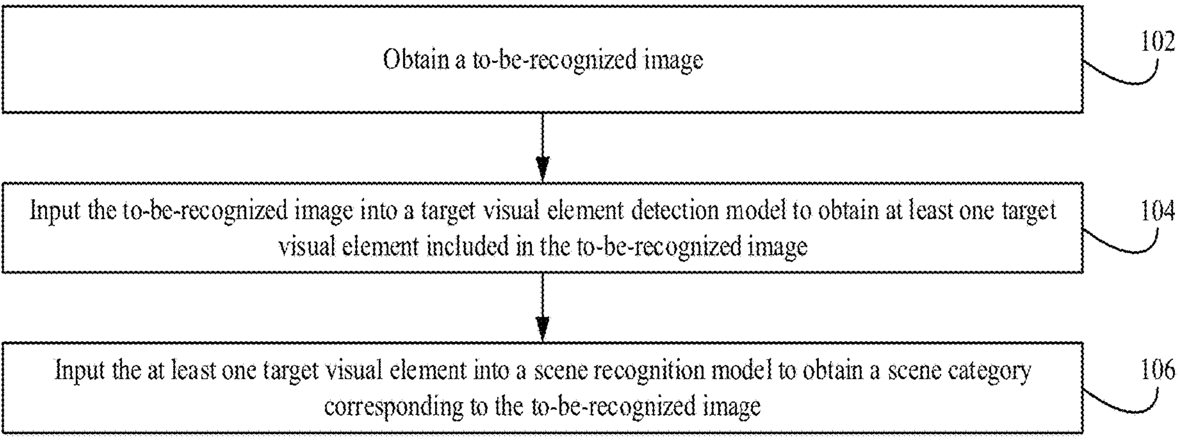
FIG. 1 is a flowchart of an image scene recognition method according to an embodiment of this application.

Many specific details are described in the following description to facilitate full understanding of this application. However, this application can be implemented in many other manners different from those described herein. A person skilled in the art can make similar promotion without departing from the connotation of this application. Therefore, this application is not limited to specific implementations disclosed below.

Terms used in one or more embodiments of this application are merely used to describe specific embodiments, and are not intended to limit the one or more embodiments of this application. The terms "a" and "the" that are in singular forms and that are used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although the terms such as "first" and "second" may be used in one or more embodiments of this application to describe various types of information, the information should not be limited to these terms. These terms are merely used to distinguish between information of a same type. For example, without departing from the scope of the one or more embodiments of this application, "first" may also be referred to as "second", and similarly, "second" may also be referred to as "first". Depending on the context, for example, the word "if" used herein can be interpreted as "while", "when", or "in response to determining".

Terms used in the one or more embodiments of this application are explained first.

Image: An image is material reproduction of human visual perception. The image may be an image naturally shot by an optical device, for example, a camera, a mirror, a telescope, or a microscope, or may be a manually drawn image, for example, a hand-painted image. The image may be recorded and stored in a medium that is sensitive to an optical signal, for example, a paper medium or a film. Professionally designed images may be developed into a visual language for communication between people, or may be used to learn about a large quantity of plane drawings, three-dimensional sculptures, and buildings in fine arts around the world. The image may include a still image or a single frame of image in a dynamic video.

Scene recognition: Scene recognition is a technology for implementing a human visual function by using a computer. An objective of scene recognition is to enable the computer to process an image and automatically recognize a scene in the image. To be specific, a macroscopic scene category presented in the image is recognized, and the category of the image may be specifically defined based on a service requirement.

Visual element: A visual element refers to a basic unit that constitutes a visual object, is a tool and a medium for a human being to receive and convey information, and is a word and a symbol of a visual communication language. Therefore, people can know and study, based on visual elements, changes in nature and human society in different time and space and all static and dynamic object information. The visual elements include information elements and form elements. The information elements include content such as a graph, text, a shape, a body; and the form elements include content such as a point, a line, a plane, a color, and space. Organization and arrangement of the form elements in a picture include arrangement of elements such as a direction, a position, space, and a center of gravity. Such organization and arrangement are used to form a relationship and an order between the elements by determining the visual elements, to construct a visual effect of an image picture. A large part of information of an image comes from visual elements. A large amount of information can be provided by using only a small quantity of visual elements during visual communication. For example, the visual elements may be a human body, an object, text, an event, an action, and the like in the image.

This application provides an image scene recognition method. This application also relates to an image scene recognition apparatus, a computing device, a computer-readable storage medium, and a computer program product, which are described in detail one by one in the following embodiments.

FIG. 1 is a flowchart of an image scene recognition method according to an embodiment of this application. The method specifically includes the following steps.

Step 102: Obtain a to-be-recognized image.

It should be noted that the to-be-recognized image may be an image waiting for scene recognition. The to-be-recognized image may be a still image or a single frame of image in a dynamic video. If the to-be-recognized image is a single frame of image in the dynamic video, a video frame in the dynamic video may be captured as the to-be-recognized image based on a scene recognition requirement when the to-be-recognized image is obtained.

In actual application, the to-be-recognized image may be obtained from another device, that is, the to-be-recognized image transmitted by the another device is received; or the to-be-recognized image may be locally obtained from a computer, that is, many images are locally prestored in the computer, and the to-be-recognized image is obtained from the locally stored images.

Step 104: Input the to-be-recognized image into a target visual element detection model to obtain at least one target visual element included in the to-be-recognized image.

Specifically, the target visual element detection model is a visual element detection machine learning model obtained in advance from a network and obtained through pre-training based on massive open source data. The target visual element detection model may recognize a common visual element in an image, that is, a microscopic visual element included in the to-be-recognized image may be obtained by using the target visual element detection model. The target visual element is a visual element that is recognized by the target visual element detection model and that is included in the to-be-recognized image, for example, a human body, an object, text, an event, or a behavior.

In an optional implementation of this embodiment, visual elements output by the target visual element detection model may include associated visual elements. Therefore, the visual elements output by the target visual element detection model may be further clustered to obtain the target visual element included in the to-be-recognized image. To be specific, a specific implementation process of inputting the to-be-recognized image into the target visual element detection model to obtain the at least one target visual element included in the to-be-recognized image may be as follows:

inputting the to-be-recognized image into the target visual element detection model to obtain at least one visual element output by the target visual element detection model;

performing semantic analysis on the output at least one visual element to determine related visual elements in the output at least one visual element; and clustering the related visual elements to obtain the at least one target visual element.

It should be noted that the to-be-recognized image may be input into the target visual element detection model, and the target visual element detection model is obtained through training based on the massive open source data. The target visual element detection model can extract and analyze a feature in the image, to recognize the visual element included in the input to-be-recognized image. Therefore, the to-be-recognized image is input into the target visual element detection model, and the target visual element detection model can output the recognized at least one visual element.

In addition, because the visual element output by the target visual element detection model is obtained by analyzing and recognizing each detail area of the image, a total quantity of visual elements output by the target visual element detection model may be large and the visual elements may be scattered. In actual application, there is an association relationship among some visual elements. These visual elements may be combined into one visual element, for example, parts of a human body may constitute a human. Therefore, in this embodiment of this application, semantic analysis can be performed on the at least one visual element output by the target visual element detection model to determine which visual elements have an association relationship, so that visual elements that have an association relationship are aggregated into one target visual element, and visual elements that have no association relationship are directly used as target visual elements.

For example, it is assumed that the visual elements output by the target visual element detection model are a hat, a head, a purple top, an arm, a pair of black shorts, a leg, a sports shoe, a mountain, water, a branch, a leaf, a petal, and a flower stem. Semantic analysis is performed on the foregoing visual elements, it may be determined that the hat, the head, the purple top, the arm, the pair of black shorts, the leg, and the sports shoe are all visual elements related to a human body, that is, the hat, the head, the purple top, the arm, the pair of black shorts, the leg, and the sports shoe may have an association relationship, and may be combined into the human body; it may be determined that the branch and the leaf are visual elements related to a tree, that is, the branch and the leaf have an association relationship, and may be combined into the tree; and it may be determined that the petal and the flower stem are visual elements related to a flower, that is, the petal and the flower stem have an association relationship, and may be combined into the flower. The mountain and the water are not associated visual elements. Therefore, the mountain and the water may be used as target visual elements alone. In this case, target visual elements included in the to-be-recognized image may be the human body, the mountain, the water, the tree, and the flower.

In this embodiment of this application, the to-be-recognized image may be first input into the target visual element detection model to obtain the at least one visual element output by the target visual element detection model, and then semantic analysis is performed on the output at least one visual element to aggregate the related visual elements in the at least one visual element output by the target visual element detection model to obtain the target visual element included in the to-be-recognized image. In this way, a large quantity of scattered visual elements may be clustered and classified, to reduce a quantity of visual elements that need to be recognized subsequently, thereby saving storage space and subsequent computing resources.

In an optional implementation of this embodiment, there may be a plurality of pre-trained visual element detection models on the network. Therefore, a visual element detection model with high precision and a high recall rate may be selected from the plurality of pre-trained visual element detection models, and is used for visual element recognition of the to-be-recognized image. To be specific, before the inputting the to-be-recognized image into a target visual element detection model to obtain at least one target visual element included in the to-be-recognized image, the method may further include:

obtaining at least one visual element detection model, and obtaining an image test set;

calculating recognition accuracy and/or recall rates of visual element detection models in the at least one visual element detection model based on the image test set; and selecting the target visual element detection model from the at least one visual element detection model based on the recognition accuracy and/or the recall rates.

It should be noted that the visual element detection model may be a model that is obtained from the network, that is pre-trained based on massive open source data, and that can perform recognition and analysis on an image. Alternatively, the visual element detection model may be a model that is obtained by independently performing pre-training based on massive open source data on the network and that can perform recognition and analysis on an image. That is, the visual element detection model may not necessarily be obtained from the network, but may be obtained through independent pre-training. However, because costs of obtaining massive data including labels are usually much higher than those of obtaining a model in practice, data used for pre-training may be obtained from the network.

In addition, the image test set may be an image set used for testing the recognition accuracy and/or the recall rate of the at least one visual element detection model.

The recognition accuracy may refer to a proportion of correctly recognized visual elements in a recognition result of the visual element detection model, and is used to determine a quantity of correctly recognized visual elements in the recognition result of the visual element detection model. The recall rate may refer to a proportion of visual elements recognized by the visual element detection model in visual elements included in an image input into the visual element detection model for testing, and is used to determine a quantity of visual elements that are in the image and that can be recognized by the visual element detection model.

In actual application, after the at least one visual element detection model is obtained from the network, the image test set may be simultaneously obtained from the network or locally, the recognition accuracy and/or the recall rates of the obtained visual element detection models are tested based on test images included in the image test set, and then a visual element detection model with high recognition accuracy and/or a high recall rate is selected from the visual element detection models as the target visual element detection model, and is used for subsequent visual element recognition of an image.

In an optimal implementation of this embodiment, the recognition accuracy and/or the recall rate of the visual element detection model may be calculated based on a result output by the visual element detection model and labels carried by the test images in the image test set, that is, the image test set may include at least one test image, and each test image carries visual element labels. In this case, a specific implementation process of calculating the recognition accuracy and/or the recall rates of the visual element detection models in the at least one visual element detection model based on the image test set may be as follows:

- for each test image in the image test set, inputting the test image into a reference visual detection model to obtain predicted visual elements output by the reference visual detection model, where the reference visual detection model is any one of the at least one visual element detection model; and
- calculating recognition accuracy and/or a recall rate of the reference visual detection model based on visual element labels of test images in the image test set and corresponding predicted visual elements.

It should be noted that the visual element labels carried by the test image are visual elements included in the test image, that is, visual elements actually included in the test image. The test image may be input into the reference visual detection model, to obtain the predicted visual elements output by the reference visual detection model, and the predicted visual elements are a prediction result of the reference visual detection model for the input test image.

In actual application, the predicted visual elements are compared with the visual element labels carried by the test image, to determine correctly predicted visual elements in the predicted visual elements, thereby calculating the recognition accuracy of the reference visual detection model for the input test image. In addition, visual elements that correspond to the visual element labels and that are included in the predicted visual elements, that is, visual elements that correspond to the visual element labels and that are correctly recognized by the reference visual detection model, may be further determined by comparing the predicted visual elements with the visual element labels carried by the test image, thereby calculating the recall rate of the reference visual detection model for the input test image.

In addition, for the test images in the image test set, recognition accuracy and/or recall rates of the reference visual detection model may be obtained according to the foregoing method. In this case, an average value of the recognition accuracy and/or the recall rates for the test images may be used as final recognition accuracy and/or recall rate of the reference visual detection model.

In this embodiment of this application, the recognition accuracy and/or the recall rates of the obtained visual element detection models may be tested based on the image test set, so that the target visual element detection model with high recognition accuracy and/or recall rate is selected from the visual element detection models based on the recognition accuracy and/or the recall rates. In this way, the selected target visual element detection model can detect the microscopic visual element in the to-be-recognized image with high precision and/or a high recall rate, thereby improving precision and accuracy of scene recognition of the to-be-recognized image.

Step 106: Input the at least one target visual element into a scene recognition model to obtain a scene category corresponding to the to-be-recognized image.

It should be noted that the at least one target visual element is obtained by performing recognition analysis on the to-be-recognized image by the target visual element detection model. Therefore, the at least one target visual element may represent image information in the to-be-recognized image. In this case, only the recognized at least one target visual element may be input into the scene recognition model.

In addition, a scene in which different visual elements appear is regular. Therefore, the scene recognition model may infer and analyze the received target visual elements to recognize the scene category corresponding to the to-be-recognized image. For example, visual elements such as a human body, a desk, a chair, and a computer may appear in an office scene, and visual elements such as a forest, water, a mountain, and a flower may appear in a natural landscape scene.

In this embodiment of this application, the scene recognition model needs to recognize only the target visual element of the to-be-recognized image, and does not need to recognize the entire to-be-recognized image. Because a data volume of the target visual element greatly decreases compared with that of the entire to-be-recognized image, required storage space can be saved, and a volume of data that needs to be recognized by the scene recognition model also greatly decreases, thereby greatly improving scene recognition efficiency. In addition, a macroscopic scene category of the to-be-recognized image may be inferred based on a local visual element of the to-be-recognized image, thereby greatly improving accuracy and precision of scene recognition.

In actual application, recognition results in different forms may be further provided for use by an upper-layer application, for example, provided in a reasonable manner, for example, through a function interface, file output, or database persistence.

In an optional implementation of this embodiment, because a quantity of target visual elements included in the to-be-recognized image is often large, and possibly tens of thousands, the at least one target visual element included in the to-be-recognized image may be encoded first, and an encoding vector is input into the scene recognition model for scene recognition. To be specific, a specific implementation process of inputting the at least one target visual element into the scene recognition model to obtain the scene category corresponding to the to-be-recognized image may be as follows:

- encoding the at least one target visual element in a preset encoding manner to obtain an encoding vector of the at least one target visual element; and inputting the encoding vector of the at least one target visual element into the scene recognition model to obtain the scene category corresponding to the to-be-recognized image.

In actual application, the preset encoding manner may be an encoding manner set in advance. The preset encoding manner may be a sparse vector encoding manner, for example, one-het encoding. Certainly, in actual application, another encoding manner may alternatively be used to encode the at least one target visual element. This is not limited in this embodiment of this application.

It should be noted that the preset encoding manner may be used first to encode the at least one target visual element, to obtain the encoding vector of the at least one target visual element. In this way, the large quantity of target visual elements are encoded into the encoding vector. Therefore, there is no need to store a large amount of text data, data storage space is saved, a recognition process of the scene recognition model can be accelerated, and recognition efficiency is improved.

In an optional implementation of this embodiment, the target visual element may carry a corresponding element probability. Therefore, an encoding value at each encoding position in the encoding vector may be set based on the element probability corresponding to the target visual element, to encode the at least one target visual element. To be specific, a specific implementation process of encoding the at least one target visual element in the preset encoding manner to obtain the encoding vector of the at least one target visual element may be as follows:

determining a vector length of the encoding vector based on an element quantity of preset visual elements; and determining, based on the at least one target visual element and a corresponding element probability, encoding values of encoding positions in the encoding vector of the vector length, to obtain the encoding vector of the at least one target visual element.

Specifically, the preset visual elements may be general visual elements that are set in advance and that may be included in different images, and the preset visual elements need to include visual elements that may appear in various images. In actual application, the element quantity of preset visual elements may be determined as the vector length of the encoding vector, that is, a length of the encoding vector is bits corresponding to the visual elements that are set in advance.

For example, it is assumed that the preset visual elements are a mountain, water, a tree, a flower, a jungle, a lake, a cloud, sky, a beach, a human body, a building, an animal, a snack, a beverage, a tableware, a table, a chair, a window, a door, a computer, and the like. Because there are 20 preset visual elements, an obtained vector length of the encoding vector is 20 bits after the at least one target visual element is encoded.

In an optional implementation of this embodiment, the element probability corresponding to the target visual element may be directly used as an encoding value at a corresponding encoding position. To be specific, a specific implementation process of determining, based on the at least one target visual element and the corresponding element probability, the encoding values of the encoding positions in the encoding vector of the vector length, to obtain the encoding vector of the at least one target visual element may be as follows:

determining, for each encoding position in the encoding vector of the vector length, a reference visual element corresponding to the encoding position; and when the at least one target visual element includes the reference visual element, using an element probability corresponding to the reference visual element in the at least one target visual element as the encoding value of the encoding position; or when the at least one target visual element does not include the reference visual element, setting the encoding value of the encoding position to a preset value.

It should be noted that the vector length of the encoding vector is determined based on the element quantity of the preset visual elements. Therefore, each encoding position in the encoding vector may correspond to one preset visual element, that is, a reference visual element. When the encoding values at the encoding positions in the encoding vector are determined, the reference visual element corresponding to the encoding position may be determined first, then whether the at least one target visual element of the to-be-recognized image includes the reference visual element is determined. If the at least one target visual element of the to-be-recognized image includes the reference visual element, it indicates that the visual element exists in the to-be-recognized image. In this case, an element probability of the reference visual element may be used as the encoding value of the encoding position. If the at least one target visual element of the to-be-recognized image does not include the reference visual element, it indicates that the to-be-recognized image does not include the visual element. In this case, the encoding value of the encoding position may be set to the preset value. The preset value may be a value set in advance, and is used to represent that no corresponding visual element exists in the to-be-recognized image. For example, the preset value may be 0.

In actual application, a vector length of an encoding vector of visual elements is usually in a unit of tens of thousands, but there are usually only a few to dozens of detected target visual elements in the to-be-recognized image, that is, most encoding positions in the encoding vector obtained by encoding the target visual elements have the preset value. Therefore, encoding positions without the preset value in the encoding vector may be further expressed in a sparse form, and elements without the preset value may be rewritten as a set of paired encoding positions and encoding values. In this way, in the foregoing sparse encoding manner, there is no need to store the encoding positions having the preset value in the encoding vector, thereby saving large storage space, improving calculation efficiency of a recognition algorithm, and reducing time and space complexity.

In the foregoing example, it is assumed that the recognized target visual elements of the to-be-recognized image are (human body, 0.95), (mountain, 0.87), (water, 0.68), (tree, 0.91), (flower, 0.34), (building, 0.89), (cloud, 0.96), and (sky, 0.85), and the vector length of the encoding vector is 20 bits. For the first encoding position in the encoding vector, the reference visual element corresponding to the encoding position is the mountain. Because the target visual elements include the mountain, the encoding value at the first encoding position in the encoding vector is 0.87. For the second encoding position in the encoding vector, the reference visual element corresponding to the encoding position is the water. Because the target visual elements include the water, the encoding value at the second encoding position in the encoding vector is 0.68, and so on. For the twentieth encoding position in the encoding vector, the reference visual element corresponding to the encoding position is the computer. Because the target visual elements do not include the computer, the encoding value at the twentieth encoding position in the encoding vector is 0. Similarly, an encoding value of an encoding position that is in the encoding vector and that corresponds to another visual element that does not exist is also 0. Therefore, the encoding vector of the at least one target visual element is [0.87, 0.68, 0.91, 0.34, 0, 0, 0.96, 0.85, 0, 0.95, 0.89, 0, 0, 0, 0, 0, 0, 0, 0, 0].

Further, non-zero elements in the encoding vector are expressed in the sparse form, and may be rewritten as a set of paired encoding positions and encoding values: {(1, 0.87), (2, 0.68), (3, 0.91), (4, 0.34), (7, 0.96), (8, 0.85), (10, 0.95), (11, 0.89)}. In the foregoing sparse encoding manner, the encoding value 0 in the encoding vector does not need to be stored, thereby saving large storage space, improving calculation efficiency of a recognition algorithm, and reducing time and space complexity.

In this embodiment of this specification, the vector length of the encoding vector can be determined based on the element quantity of preset visual elements, and the encoding values of the encoding positions in the encoding vector are set based on element probabilities corresponding to the target visual elements, to obtain the encoding vector for which encoding is completed. Therefore, an encoding manner is brief, encoding efficiency is improved, and scene recognition efficiency of the to-be-recognized image is improved.

In an optional implementation of this embodiment, the foregoing scene recognition model may be obtained through training according to the following method:

obtaining a sample image set, where the sample image set includes sample images of at least two different scene categories, and each sample image carries a corresponding scene category label;

for each sample image included in the sample image set, inputting the sample image into the target visual element detection model to obtain at least one sample visual element included in the sample image, inputting the at least one sample visual element into an initial recognition model to obtain a predicted scene category output by the initial recognition model, and calculating a loss value corresponding to the sample image based on the predicted scene category and the scene category label carried by the sample image; and determining an average loss value of loss values corresponding to the sample images included in the sample image set, adjusting a model parameter of the initial recognition model based on the average loss value, returning to perform an operation step of obtaining the sample image set until a training stop condition is met, and obtaining the scene recognition model for which training is completed.

Specifically, the sample image set may be an image set used to train the initial recognition model to obtain the scene recognition model that can implement scene recognition. The sample image set may include a large quantity of sample images of different scene categories. Each sample image needs to carry a sample label. The sample label is a scene category label corresponding to the sample image. The scene category label may refer to a real scene category of a sample image. The scene category label may be manually labeled. Because one image may correspond to more than one scene category, the scene category label may include at least one scene category. In addition, the predicted scene category is a scene category that corresponds to the sample image and that is predicted by the initial recognition model based on the input at least one sample visual element. The predicted scene category may also include at least one scene category.

In addition, the initial recognition model may be a model that is not trained. In actual application, a classic discriminative model or generative model in the field of machine learning may be selected, and then the selected initial recognition model is trained based on the sample images, to obtain the scene recognition model that can perform image scene recognition.

In addition, after the initial recognition model is selected, when the selected initial recognition model is trained, an ensemble learning manner may be further used to improve scene recognition precision. In a specific implementation, if a training sample is excessively small, the trained scene recognition model may be overfitted. Therefore, to avoid an overfitting phenomenon, the sample image set may be obtained through random sampling, to train an initial model, or a plurality of scene recognition models may be obtained for the initial recognition model, and parameters in the plurality of trained scene recognition models are averaged to obtain a final scene recognition model, thereby reducing overfitting phenomena.

In actual application, a cross entropy loss function may be calculated based on the predicted scene categories and the scene category labels of the sample images in the sample image set, to generate loss values of the sample images. Then, a parameter of the initial recognition model is iteratively adjusted based on gradient backpropagation of the average loss value of the sample image set, until the training stop condition is met. In this way, the scene recognition model for which training is completed can be obtained. The scene category label refers to a result that is actually expected to be output by the initial recognition model, that is, the scene category label is a real result. The at least one sample visual element is input into the initial recognition model, and the output predicted scene category is a prediction result. When an average value of differences between prediction results of the sample images included in the sample image set and the real result is sufficiently small, it indicates that the prediction results of a large quantity of sample images are sufficiently close to the real result. In this case, training for the initial recognition model is completed, and the scene recognition model is obtained.

In this specification, the loss value is calculated to visually show the difference between the prediction result of the model and the real result, then targeted training is performed on the initial recognition model, and the parameter is adjusted, thereby effectively improving a model training rate and a model training effect.

In an optional implementation of this embodiment, that a training stop condition is met may include:

determining whether the average loss value is less than a preset threshold; and if the average loss value is not less than the preset threshold, determining that the training stop condition is not met; or if the average loss value is less than the preset threshold, determining that the training stop condition is met.

The preset threshold is a threshold for the loss values. When the average loss value is greater than or equal to the preset threshold, it indicates that there are still specific deviations between the prediction results of the sample images in the sample image set and the real result, and the parameter of the initial recognition model still needs to be adjusted. When the average loss value is less than the preset threshold, it indicates that the prediction results of the sample images in the sample image set are sufficiently close to the real result, and training can be stopped. A value of the preset threshold may be determined based on an actual situation. This is not limited in this specification.

In this specification, a specific training condition of the initial recognition model may be determined based on the average loss value of the sample images included in the sample image set, and when training is unqualified, the parameter of the initial recognition model is inversely adjusted based on the average loss value, thereby improving an analysis capability of the initial recognition model. In this case, a training rate is high, and a training effect is good.

In an optional implementation of this embodiment, because a quantity of sample visual elements included in the sample image may also be large, and possibly tens of thousands, the at least one sample visual element included in the sample image may be first encoded, and then a sample encoding vector is input into the initial recognition model to perform model training. To be specific, a specific implementation process of inputting the at least one sample visual element into the initial recognition model to obtain the predicted scene category output by the initial recognition model may be as follows:

- encoding the at least one sample visual element in the preset encoding manner to obtain a sample encoding vector of the at least one sample visual element; and
- inputting the sample encoding vector into the initial recognition model to obtain the predicted scene category output by the initial recognition model.

In actual application, an encoding manner for encoding the at least one sample visual element in a training stage should be the same as an encoding manner for encoding the at least one target visual element in an application stage, thereby ensuring that the scene recognition model for which training is completed can accurately analyze the input encoding vector in the application stage, to recognize a corresponding scene category.

It should be noted that a specific implementation in which the at least one sample visual element is encoded in the training stage is similar to a specific implementation in which the at least one target visual element is encoded in the application stage. Details are not described herein again in this application.

Figure 2:
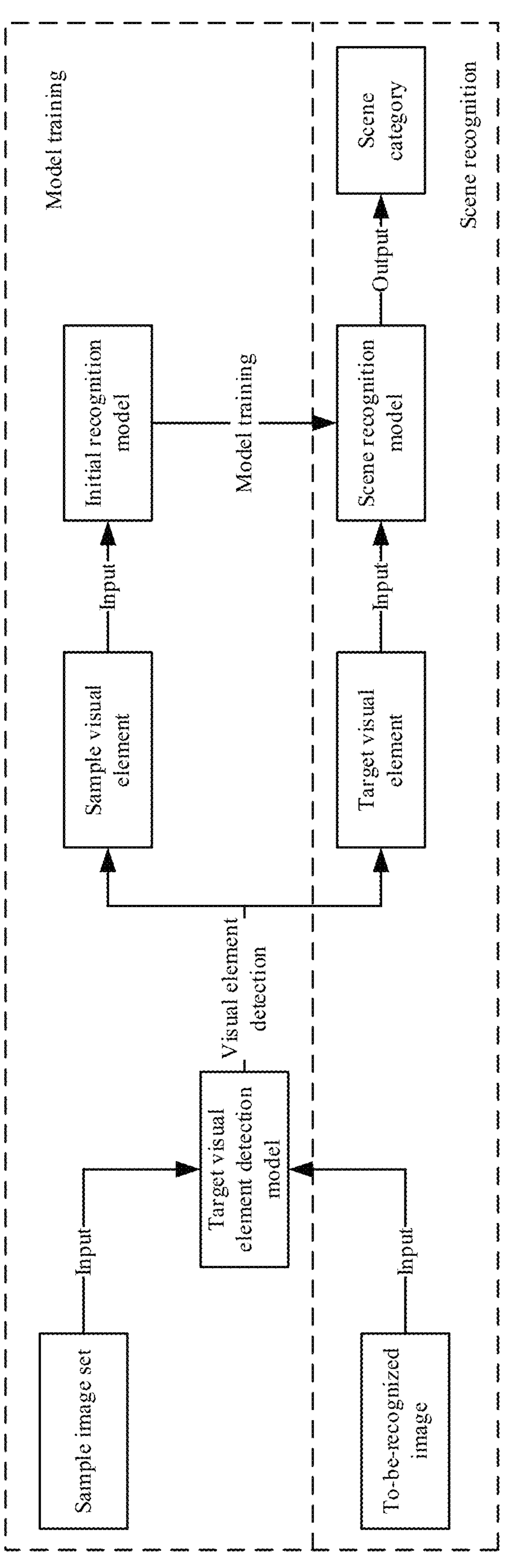
FIG. 2 is a schematic diagram of an image scene recognition process according to an embodiment of this application.

For example, FIG. 2 is a schematic diagram of an image scene recognition process according to an embodiment of this application. As shown in FIG. 2, the sample image set is first obtained, the sample images in the sample image set are input into the target visual element detection model to perform visual element detection, to obtain the sample visual elements included in the sample images in the sample image set, and then the obtained sample visual elements included in the sample images in the sample image set are input into the initial recognition model to perform model training, to obtain the scene recognition model for which training is completed. In this case, a model training process is completed. Then, the to-be-recognized image may be obtained, and the to-be-recognized image is input into the target visual element detection model to perform visual element detection, to obtain the target visual element included in the to-be-recognized image. Then, the obtained target visual element included in the to-be-recognized image is input into the scene recognition model to obtain the scene category corresponding to the to-be-recognized image. In this case, scene recognition of the to-be-recognized image is completed.

It should be noted that, for a conventional end-to-end scene recognition method, an input to a model is a to-be-recognized image, and an output is a recognized scene category. That is, the model needs to learn both a macroscopic global feature extraction method and a scene classification method. Only a large quantity of training samples can support model training. To be specific, in the conventional end-to-end scene recognition method, a large quantity of training samples (that is, images whose scene categories are already known) are required during model training, and a large quantity of training policies and parameters are usually need to be adjusted to obtain a model that meets a recognition requirement. Consequently, a training process of the model is complex and difficult, a large amount of time, capital, and software/hardware costs need to be consumed in the training process, and a requirement for an execution device is high.

Therefore, in this embodiment of this application, the visual elements of the to-be-recognized image may be first detected by using the obtained target visual element detection model. The scene recognition model needs to infer, based on only microscopic visual elements such as a human body, an object, text, an event, and an action in the image, a scene category in which these visual elements may coexist, to recognize the scene category corresponding to the image. In this way, the microscopic visual elements in the scene category are detected by using the target visual element detection model pre-trained based on massive data, and subsequently, the scene recognition model only needs to learn a relationship between the microscopic visual elements to infer the scene category in which the microscopic visual elements coexist, thereby implementing scene recognition.

That is, in this embodiment of this application, both a training process and an application process of the scene recognition model are concentrated on a classification task, and there is no need to learn both the macroscopic global feature extraction method and the scene classification method. Therefore, dependency on scene image training samples is greatly reduced during training of the scene recognition model, thereby improving a training speed, simplifying training difficulty, and achieving better recognition precision. In this way, the training process and a scene recognition process of the scene recognition model can run on a resource-limited edge device (for example, a common desktop computer, a tablet computer, or a mobile phone), or can run on a resource-rich cloud device (for example, a computing cluster, a server, or a work station), thereby reducing a requirement for device performance.

It should be noted that, when a recognition result is output, the scene category may be separately output, or the recognized target visual element and scene category are simultaneously output.

Figure 3:
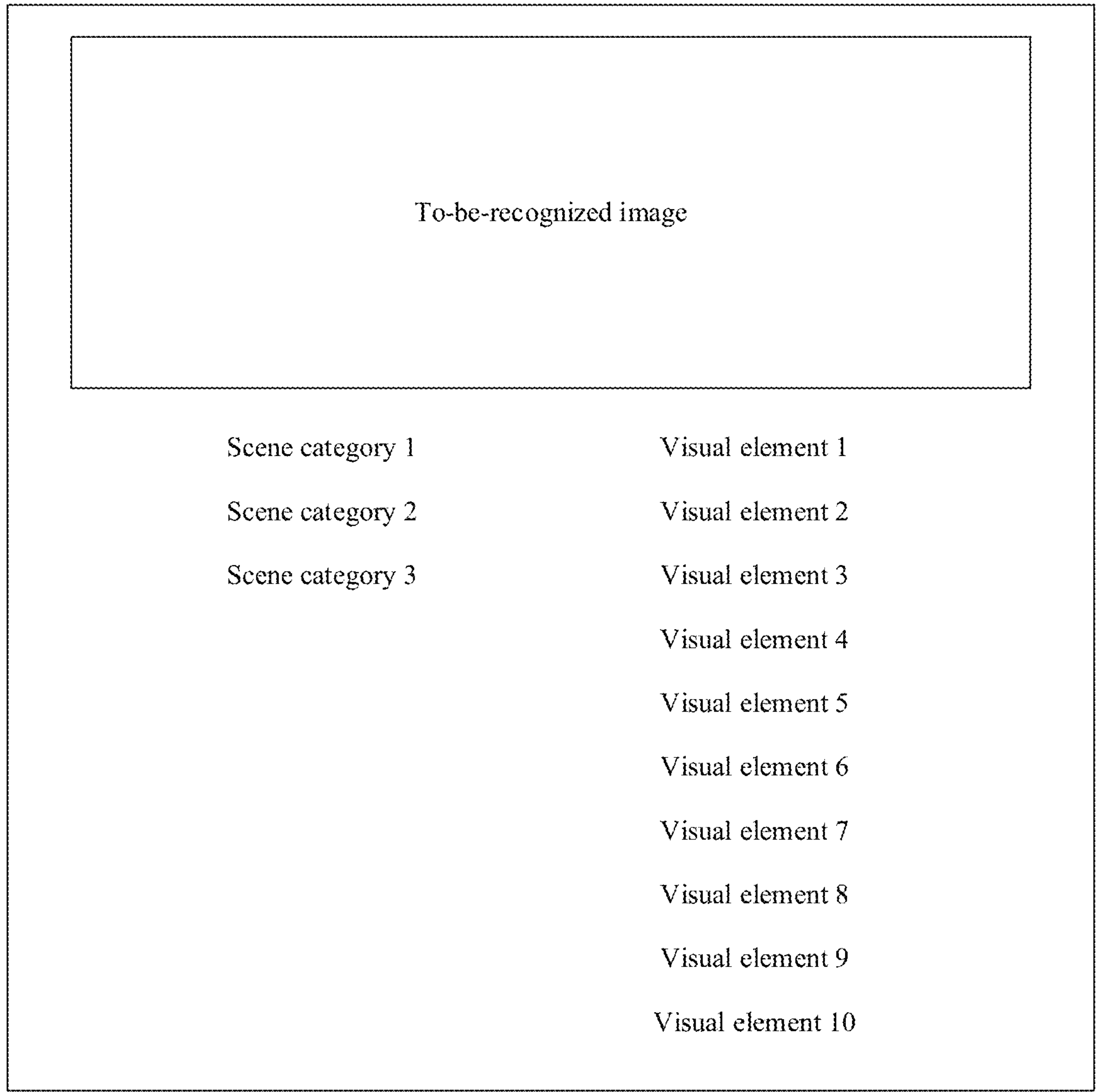
FIG. 3 is a schematic diagram of displaying a scene recognition result according to an embodiment of this application.

For example, FIG. 3 is a schematic diagram of displaying a scene recognition result according to an embodiment of this application. As shown in FIG. 3, when the scene recognition result is displayed, the to-be-recognized image may be displayed above, the recognized at least one target visual element (for example, a visual element 1 to a visual element 10) is displayed on a right side below the to-be-recognized image, and at least one recognized scene category (for example, a scene category 1, a scene category 2, and a scene category 3) corresponding to the to-be-recognized image is displayed on a left side below the to-be-recognized image.

According to the image scene recognition method provided in this application, the to-be-recognized image can be first obtained, then the to-be-recognized image is input into the target visual element detection model to obtain the at least one target visual element included in the to-be-recognized image, and then the at least one target visual element is input into the scene recognition model to obtain the scene category corresponding to the to-be-recognized image. In this case, the to-be-recognized image may be first recognized to obtain the microscopic visual elements in the to-be-recognized image, then the microscopic visual elements are input into the scene recognition model, and the macroscopic scene category in which the microscopic visual elements may coexist is inferred by using the scene recognition model. In this way, the scene category of the to-be-recognized image is recognized. Therefore, overall macroscopic global feature extraction and analysis are not performed on an image on a top-down basis, but a bottom-up scene recognition method is used. In this way, the macroscopic scene category in which the microscopic visual elements may coexist is inferred based on the microscopic visual elements, thereby implementing scene recognition, and greatly improving recognition precision and accuracy during image scene recognition.

Figure 4:
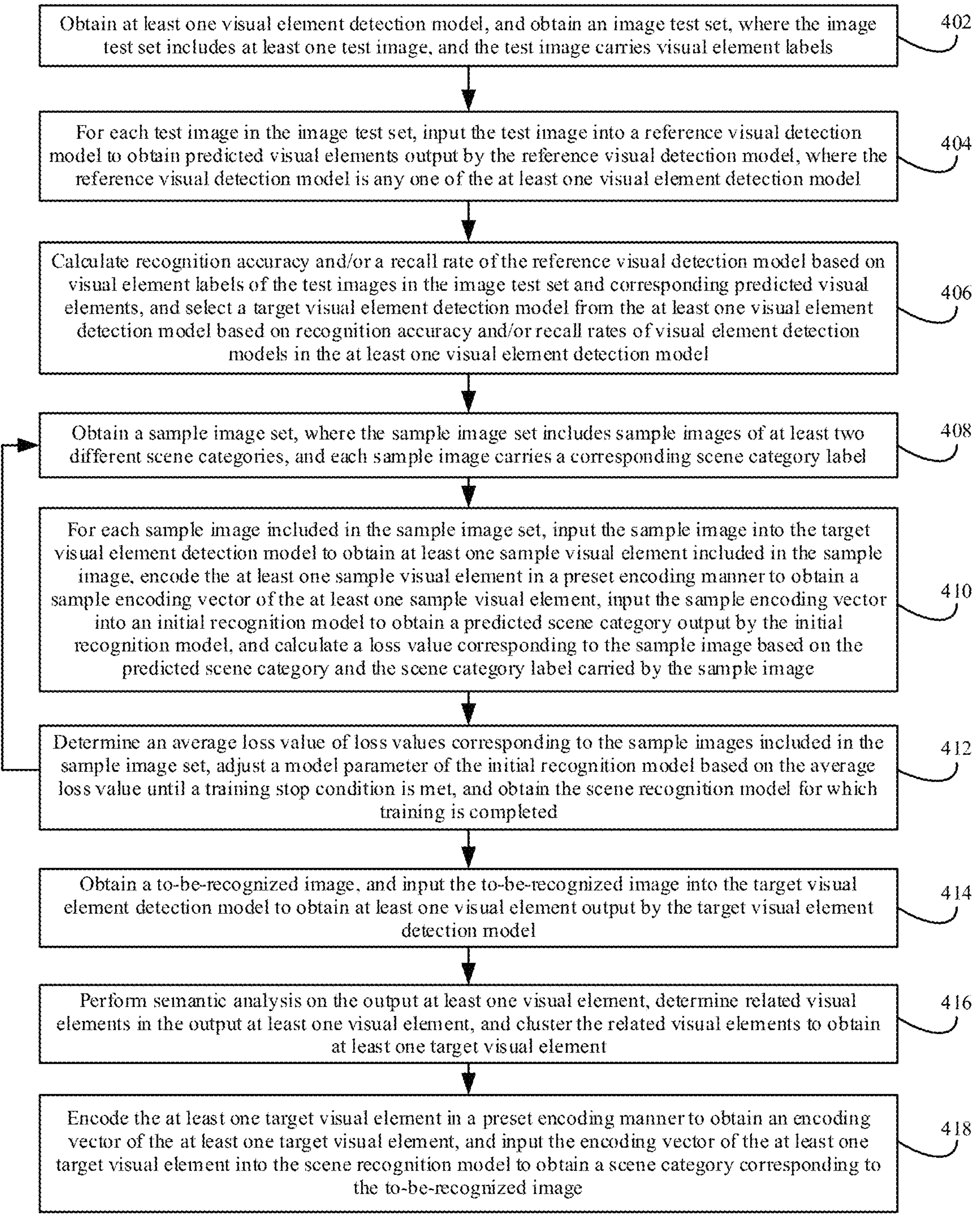
FIG. 4 is a flowchart of processing of an image scene recognition process according to an embodiment of this application.

FIG. 4 is a flowchart of processing of an image scene recognition process according to an embodiment of this application. The processing specifically includes the following steps:

Step 402: Obtain at least one visual element detection model, and obtain an image test set, where the image test set includes at least one test image, and the test image carries visual element labels.

Step 404: For each test image in the image test set, input the test image into a reference visual detection model to obtain predicted visual elements output by the reference visual detection model, where the reference visual detection model is any one of the at least one visual element detection model.

Step 406: Calculate recognition accuracy and/or a recall rate of the reference visual detection model based on visual element labels of the test images in the image test set and corresponding predicted visual elements, and select a target visual element detection model from the at least one visual element detection model based on recognition accuracy and/or recall rates of visual element detection models in the at least one visual element detection model.

Step 408: Obtain a sample image set, where the sample image set includes sample images of at least two different scene categories, and each sample image carries a corresponding scene category label.

Step 410: For each sample image included in the sample image set, input the sample image into the target visual element detection model to obtain at least one sample visual element included in the sample image, encode the at least one sample visual element in a preset encoding manner to obtain a sample encoding vector of the at least one sample visual element, input the sample encoding vector into an initial recognition model to obtain a predicted scene category output by the initial recognition model, and calculate a loss value corresponding to the sample image based on the predicted scene category and the scene category label carried by the sample image.

In an optional implementation of this embodiment, the target visual element may carry a corresponding element probability. Therefore, the encoding value at each encoding position in the encoding vector may be set based on the element probability corresponding to the target visual element, to encode the at least one target visual element. To be specific, a specific implementation process of encoding the at least one target visual element in the preset encoding manner to obtain the encoding vector of the at least one target visual element may be as follows:

determining a vector length of the encoding vector based on an element quantity of preset visual elements; and determining, based on the at least one target visual element and a corresponding element probability, encoding values of encoding positions in the encoding vector of the vector length, to obtain the encoding vector of the at least one target visual element.

In an optional implementation of this embodiment, the element probability corresponding to the target visual element may be directly used as an encoding value at a corresponding encoding position. To be specific, a specific implementation process of determining, based on the at least one target visual element and the corresponding element probability, the encoding values of the encoding positions in the encoding vector of the vector length, to obtain the encoding vector of the at least one target visual element may be as follows:

determining, for each encoding position in the encoding vector of the vector length, a reference visual element corresponding to the encoding position; and when the at least one target visual element includes the reference visual element, using an element probability corresponding to the reference visual element in the at least one target visual element as the encoding value of the encoding position; or when the at least one target visual element does not include the reference visual element, setting the encoding value of the encoding position to a preset value.

Step 412: Determine an average loss value of loss values corresponding to the sample images included in the sample image set, adjust a model parameter of the initial recognition model based on the average loss value, return to perform an operation step of step 408 until a training stop condition is met, and obtain the scene recognition model for which training is completed.

Step 414: Obtain a to-be-recognized image, and input the to-be-recognized image into the target visual element detection model to obtain at least one visual element output by the target visual element detection model.

Step 416: Perform semantic analysis on the output at least one visual element, determine related visual elements in the output at least one visual element, and cluster the related visual elements to obtain at least one target visual element.

Step 418: Encode the at least one target visual element in a preset encoding manner to obtain an encoding vector of the at least one target visual element, and input the encoding vector of the at least one target visual element into the scene recognition model to obtain a scene category corresponding to the to-be-recognized image.

According to the image scene recognition method provided in this application, the to-be-recognized image may be first recognized to obtain microscopic visual elements in the to-be-recognized image, then the microscopic visual elements are input into the scene recognition model, and a macroscopic scene category in which the microscopic visual elements may coexist is inferred by using the scene recognition model. In this way, the scene category of the to-be-recognized image is recognized. Therefore, overall macroscopic global feature extraction and analysis are not performed on an image on a top-down basis, but a bottom-up scene recognition method is used. In this way, the macroscopic scene category in which the microscopic visual elements may coexist is inferred based on the microscopic visual elements, thereby implementing scene recognition, and greatly improving recognition precision and accuracy during image scene recognition.

Figure 5:
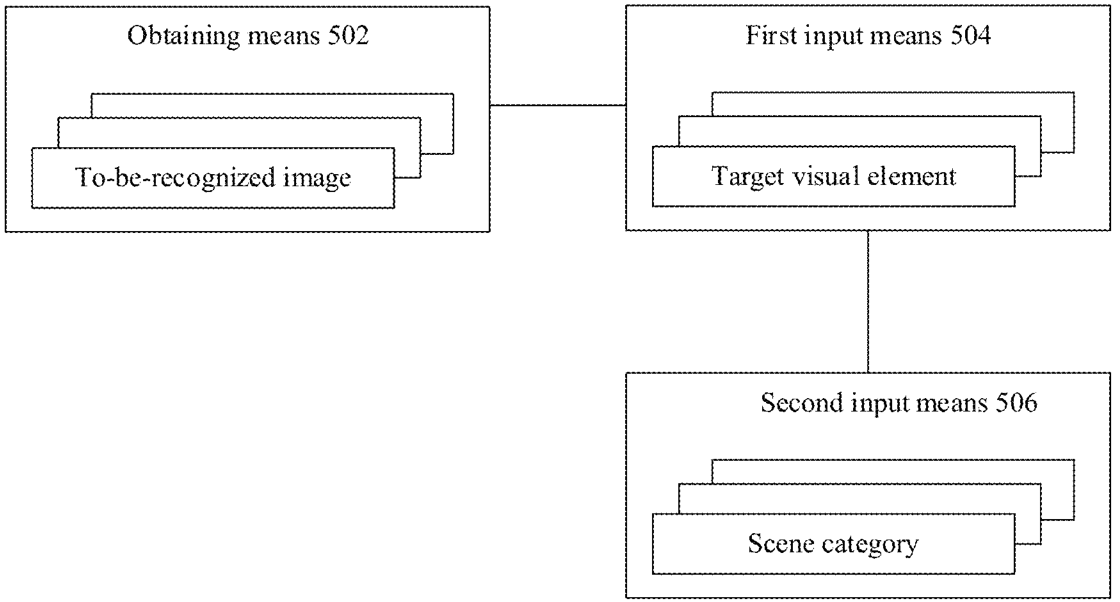
FIG. 5 is a schematic diagram of a structure of an image scene recognition apparatus according to an embodiment of this application.

Corresponding to the foregoing method embodiments, this application further provides an embodiment of an image scene recognition apparatus. FIG. 5 is a schematic diagram of a structure of an image scene recognition apparatus according to an embodiment of this application. As shown in FIG. 5, the apparatus includes:

- an obtaining means 502, configured to obtain a to-be-recognized image;
- a first input means 504, configured to input the to-be-recognized image into a target visual element detection model to obtain at least one target visual element included in the to-be-recognized image; and
- a second input means 506, configured to input the at least one target visual element into a scene recognition model to obtain a scene category corresponding to the to-be-recognized image.

Optionally, the first input means 504 is further configured to:

- input the to-be-recognized image into the target visual element detection model to obtain at least one visual element output by the target visual element detection model;
- perform semantic analysis on the output at least one visual element to determine related visual elements in the output at least one visual element; and
- cluster the related visual elements to obtain the at least one target visual element.

Optionally, the second input means 506 is further configured to:

- encode the at least one target visual element in a preset encoding manner to obtain an encoding vector of the at least one target visual element; and
- input the encoding vector of the at least one target visual element into the scene recognition model to obtain the scene category corresponding to the to-be-recognized image.

Optionally, the target visual element carries an element probability. The second input means 506 is further configured to:

- determine a vector length of the encoding vector based on an element quantity of preset visual elements; and
- determine, based on the at least one target visual element and a corresponding element probability, encoding values of encoding positions in the encoding vector of the vector length, to obtain the encoding vector of the at least one target visual element.

Optionally, the second input means 506 is further configured to:

- determine, for each encoding position in the encoding vector of the vector length, a reference visual element corresponding to the encoding position; and
- when the at least one target visual element includes the reference visual element, use an element probability corresponding to the reference visual element in the at least one target visual element as the encoding value of the encoding position; or
- when the at least one target visual element does not include the reference visual element, set the encoding value of the encoding position to a preset value.

Optionally, the image scene recognition apparatus further includes a calculation means, configured to:

- obtain at least one visual element detection model, and obtain an image test set;
- calculate recognition accuracy and/or recall rates of visual element detection models in the at least one visual element detection model based on the image test set; and
- select the target visual element detection model from the at least one visual element detection model based on the recognition accuracy and/or the recall rates.

Optionally, the image test set includes at least one test image, and the test image carries visual element labels. The calculation means is further configured to:

- for each test image in the image test set, input the test image into a reference visual detection model to obtain predicted visual elements output by the reference visual detection model, where the reference visual detection model is any one of the at least one visual element detection model; and
- calculate recognition accuracy and/or a recall rate of the reference visual detection model based on visual element labels of test images in the image test set and corresponding predicted visual elements.

Optionally, the image scene recognition apparatus further includes a training means, configured to:

- obtain a sample image set, where the sample image set includes sample images of at least two different scene categories, and each sample image carries a corresponding scene category label;
- for each sample image included in the sample image set, input the sample image into the target visual element detection model to obtain at least one sample visual element included in the sample image, input the at least one sample visual element into an initial recognition model to obtain a predicted scene category output by the initial recognition model, and calculate a loss value corresponding to the sample image based on the predicted scene category and the scene category label carried by the sample image; and
- determine an average loss value of loss values corresponding to the sample images included in the sample image set, adjust a model parameter of the initial recognition model based on the average loss value, return to perform an operation step of obtaining the sample image set until a training stop condition is met, and obtain the scene recognition model for which training is completed.

Optionally, the training means is further configured to:

- encode the at least one sample visual element in the preset encoding manner to obtain a sample encoding vector of the at least one sample visual element; and
- input the sample encoding vector into the initial recognition model to obtain the predicted scene category output by the initial recognition model.

In the image scene recognition apparatus provided in this application, the to-be-recognized image may be first recognized to obtain microscopic visual elements in the to-be-recognized image, then the microscopic visual elements are input into the scene recognition model, and a macroscopic scene category in which the microscopic visual elements may coexist is inferred by using the scene recognition model. In this way, the scene category of the to-be-recognized image is recognized. Therefore, overall macroscopic global feature extraction and analysis are not performed on an image on a top-down basis, but a bottom-up scene recognition method is used. In this way, the macroscopic scene category in which the microscopic visual elements may coexist is inferred based on the microscopic visual elements, thereby implementing scene recognition, and greatly improving recognition precision and accuracy during image scene recognition.

The foregoing describes a schematic solution of the image scene recognition apparatus according to this embodiment. It should be noted that, the technical solution of the image scene recognition apparatus and the technical solution of the foregoing image scene recognition method belong to a same concept. For details not described in detail in the technical solution of the image scene recognition apparatus, refer to the descriptions of the technical solution of the foregoing image scene recognition method.

Figure 6:
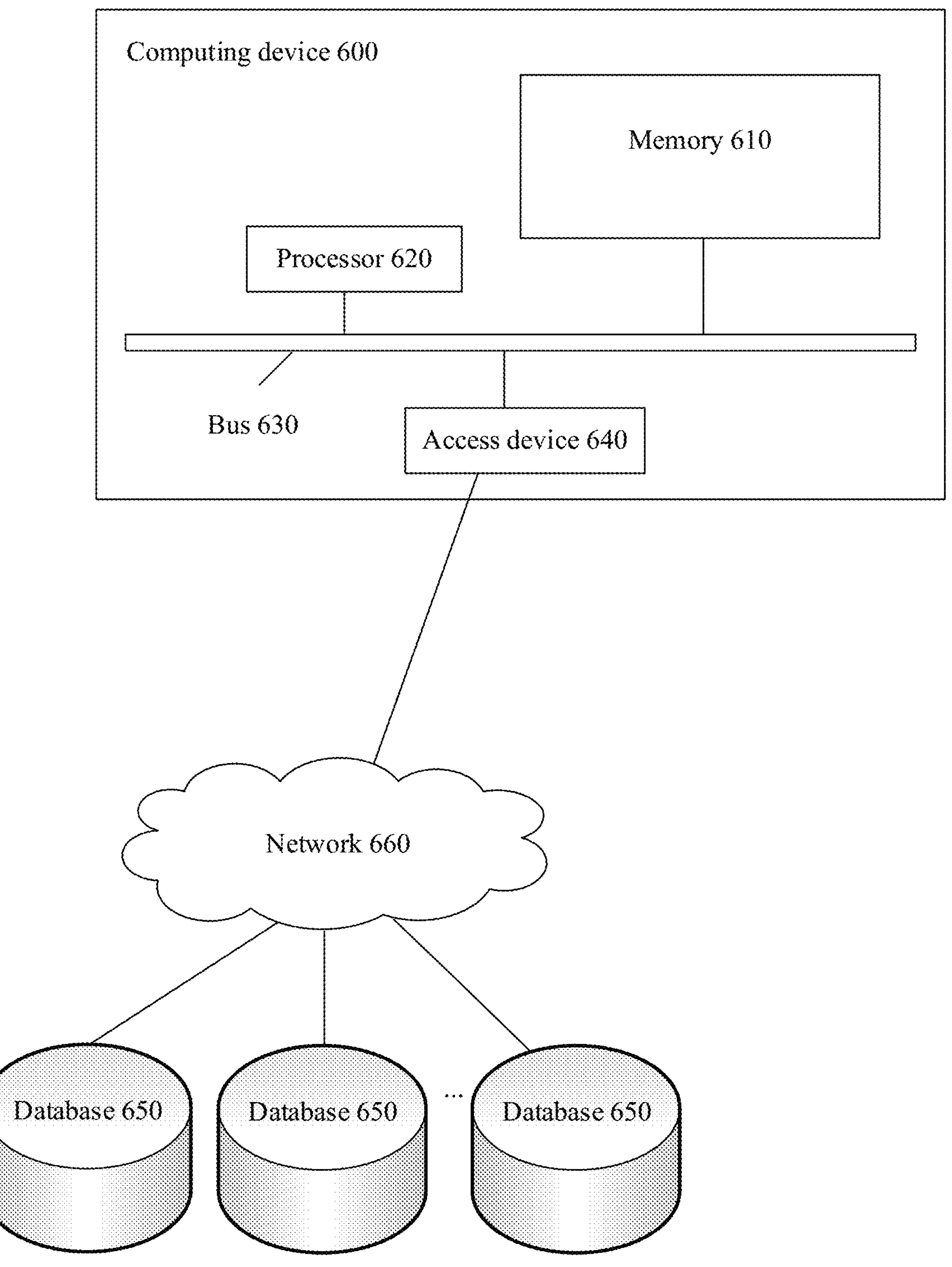
FIG. 6 is a block diagram of a structure of a computing device according to an embodiment of this application.

FIG. 6 is a block diagram of a structure of a computing device 600 according to an embodiment of this application. Components of the computing device 600 include but are not limited to a memory 610 and a processor 620. The processor 620 is connected to the memory 610 by using a bus 630, and a database 650 is configured to store data.

The computing device 600 further includes an access device 640. The access device 640 enables the computing device 600 to perform communication by using one or more networks 660. Examples of these networks include a public switched telephone network (PSTN), a local area network (LAN), a wide area network (WAN), a private area network (PAN), or a combination of communication networks such as the Internet. The access device 640 may include one or more of any type of wired or wireless network interfaces (for example, a network interface card (NIC)), such as an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In an embodiment of this application, the foregoing components of the computing device 600 and other components not shown in FIG. 6 may be connected to each other, for example, by using a bus. It should be understood that the block diagram of the structure of the computing device shown in FIG. 6 is merely used as an example instead of a limitation on the scope of this application. A person skilled in the art can add or replace other components as required.

The computing device 600 may be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), another type of mobile device, or a stationary computing device, for example, a desktop computer or a PC. The computing device 600 may alternatively be a mobile or stationary server.

The processor 620 is configured to execute the following computer-executable instructions:

obtaining a to-be-recognized image;

inputting the to-be-recognized image into a target visual element detection model to obtain at least one target visual element included in the to-be-recognized image; and inputting the at least one target visual element into a scene recognition model to obtain a scene category corresponding to the to-be-recognized image.

The foregoing describes a schematic solution of the computing device in this embodiment. It should be noted that, the technical solution of the computing device and the technical solution of the foregoing image scene recognition method belong to a same concept. For details not described in detail in the technical solution of the computing device, refer to the descriptions of the technical solution of the foregoing image scene recognition method.

An embodiment of this application further provides a computer-readable storage medium. The computer-readable storage medium stores computer-executable instructions, and when the computer-executable instructions are executed by a processor, steps of any image scene recognition method are implemented.

The foregoing describes a schematic solution of the computer-readable storage medium in this embodiment. It should be noted that, the technical solution of the storage medium and the technical solution of the foregoing image scene recognition method belong to a same concept. For details not described in detail in the technical solution of the storage medium, refer to the descriptions of the technical solution of the foregoing image scene recognition method.

An embodiment of this application further provides a computer program product. When the computer program product is executed in a computer, the computer is enabled to perform steps of any image scene recognition method described above.

The foregoing describes a schematic solution of the computer program product in this embodiment. It should be noted that, the technical solution of the computer program product and the technical solution of the foregoing image scene recognition method belong to a same concept. For details not described in detail in the technical solution of the computer program product, refer to the descriptions of the technical solution of the foregoing image scene recognition method.

The foregoing describes specific embodiments of this application. Other embodiments fall within the scope of the appended claims. In some cases, actions or steps recorded in the claims may be performed in an order different from that in the embodiments and desired results may still be achieved. In addition, processes depicted in the accompanying drawings do not necessarily require shown specific orders or sequences to achieve the desired results. In some implementations, multitasking and parallel processing are also possible or may be advantageous.

The computer instructions include computer program code, and the computer program code may be in a source code form, an object code form, an executable file form, some intermediate forms, or the like. The computer-readable medium may include any entity or apparatus capable of carrying computer program code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, or the like. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal or a telecommunications signal.

It should be noted that, for brief description, the foregoing method embodiments are represented as a combination of a series of actions. However, a person skilled in the art should be aware that this application is not limited to the described order of the actions, because some steps may be performed in other orders or simultaneously according to this application. In addition, a person skilled in the art should also be aware that the embodiments described in this specification are all preferred embodiments, and used actions and means are not necessarily mandatory to this application.

In the foregoing embodiments, the descriptions of the embodiments have respective focuses. For a part that is not described in detail in a specific embodiment, refer to related descriptions in other embodiments.

The preferred embodiments of this application disclosed above are merely intended to help describe this application. In the optional embodiments, not all details are described in detail, and this application is not limited to only the specific implementations. Clearly, many modifications and variations may be made based on the content of this application. In this application, these embodiments are selected and specifically described to better explain the principle and actual application of this application, so that a person skilled in the art can well understand and use this application. This application is merely limited to the claims and a full scope and equivalents thereof.

What is claimed is:

1. A method for improving image recognition accuracy by utilizing a machine learning model, comprising:

obtaining a to-be-recognized image;

inputting the to-be-recognized image into a first sub-model of the machine learning model;

recognizing a plurality of visual elements in the to-be-recognized image by the first sub-model of the machine learning model;

determining related visual elements among the plurality of visual elements by performing semantic analysis on the plurality of visual elements;

clustering the related visual elements to obtain at least one target visual element, wherein each of the at least one target visual element carries an element probability;

encoding the at least one target visual element in a preset encoding manner and generating an encoding vector of the at least one target visual element, wherein encoding the at least one target visual element and generating the encoding vector of the at least one target visual element comprises:

determining a vector length of the encoding vector based on an element quantity of preset visual elements, and determining an encoding value at each encoding position in the encoding vector having the vector length based on the at least one target visual element and the element probability corresponding to each of the at least one target visual element;

inputting the encoding vector of the at least one target visual element into a second sub-model of the machine learning model; and generating a scene category corresponding to the to-be-recognized image by the second sub-model of the machine learning model.

2. The method according to claim 1, wherein the determining the encoding value at each encoding position in the encoding vector having the vector length based on the at least one target visual element and a corresponding element probability comprises:

determining, with respect to each encoding position in the encoding vector having the vector length, a reference visual element corresponding to the encoding position;

in response to determining that the at least one target visual element comprises the reference visual element, identifying an element probability corresponding to the reference visual element in the at least one target visual element as the encoding value of the encoding position; and in response to determining that the at least one target visual element does not comprise the reference visual element, setting the encoding value of the encoding position to a preset value.

3. The method according to claim 1, wherein before inputting the to-be-recognized image into the first sub-model of the machine learning model, and determining at least one target visual element comprised in the to-be-recognized image, the method further comprises:

obtaining at least one visual element detection model, and obtaining a set of test images;

calculating at least one of a recognition accuracy or a recall rate corresponding to each of the at least one visual element detection model using the set of test images; and selecting the first sub-model of the machine learning model from the at least one visual element detection model based on the at least one of the recognition accuracy or the recall rate.

4. The method according to claim 3, wherein the set of test images comprises a plurality of test images, and each test image carries visual element labels; and wherein the calculating the at least one of the recognition accuracy or the recall rate corresponding to each of the at least one visual element detection model using the set of test images comprises:

for each test image, inputting the test image into a reference visual detection model to obtain predicted visual elements output from the reference visual detection model, wherein the reference visual detection model is any one of the at least one visual element detection model; and calculating at least one of a recognition accuracy or a recall rate of the reference visual detection model based on the visual element labels of each test image and corresponding predicted visual elements.

5. The method according to claim 1, wherein the second sub-model of the machine learning model is obtained through a training process comprising:

obtaining a set of sample images, wherein the set of sample images comprises sample images belonging to at least two different scene categories, and each sample image carries a corresponding scene category label;

for each sample image, inputting the sample image into the first sub-model of the machine learning model to obtain at least one sample visual element, inputting the at least one sample visual element into an initial recognition model to obtain a predicted scene category output from the initial recognition model, and calculating a loss value corresponding to the sample image based on the predicted scene category and a scene category label corresponding to the sample image; and determining an average loss value of loss values corresponding to the sample images, adjusting a model parameter of the initial recognition model based on the average loss value, returning to perform an operation of obtaining a sample image set and iterating training operations until a training stop condition is met, and obtaining the second sub-model of the machine learning model which has completed the training process.

6. The method according to claim 5, wherein the inputting the at least one sample visual element into the initial recognition model to obtain the predicted scene category output from the initial recognition model comprises:

encoding the at least one sample visual element in a preset encoding manner to obtain a sample encoding vector of the at least one sample visual element; and inputting the sample encoding vector into the initial recognition model to obtain the predicted scene category output from the initial recognition model.

7. The method according to claim 1, wherein the second sub-model of the machine learning model is trained to learn a relationship between different visual elements and generate a scene category in which the different visual elements coexist.

8. A computing device, comprising:

a memory and a processor, wherein the memory is configured to store computer-executable instructions, and wherein the computer-executable instructions upon execution by the processor cause the processor to implement operations comprising:

obtaining a to-be-recognized image;

inputting the to-be-recognized image into a first sub-model of a machine learning model;

recognizing a plurality of visual elements in the to-be-recognized image by the first sub-model of the machine learning model;

determining related visual elements among the plurality of visual elements by performing semantic analysis on the plurality of visual elements;

clustering the related visual elements to obtain at least one target visual element, each of the at least one target visual element carries an element probability;

encoding the at least one target visual element in a preset encoding manner and generating an encoding vector of the at least one target visual element, wherein encoding the at least one target visual element and generating the encoding vector of the at least one target visual element comprises:

determining a vector length of the encoding vector based on an element quantity of preset visual elements, and determining an encoding value at each encoding position in the encoding vector having the vector length based on the at least one target visual element and the element probability corresponding to each of the at least one target visual element;

inputting the encoding vector of the at least one target visual element into a second sub-model of the machine learning model; and generating a scene category corresponding to the to-be-recognized image by the second sub-model of the machine learning model.

9. The computing device according to claim 8, wherein the determining the encoding value at each encoding position in the encoding vector having the vector length based on the at least one target visual element and a corresponding element probability comprises:

determining, with respect to each encoding position in the encoding vector having the vector length, a reference visual element corresponding to the encoding position;

in response to determining that the at least one target visual element comprises the reference visual element, identifying an element probability corresponding to the reference visual element in the at least one target visual element as the encoding value of the encoding position; and in response to determining that the at least one target visual element does not comprise the reference visual element, setting the encoding value of the encoding position to a preset value.

10. The computing device according to claim 8, wherein the second sub-model of the machine learning model is obtained through a training process comprising:

obtaining a set of sample images, wherein the set of sample images comprises sample images belonging to at least two different scene categories, and each sample image carries a corresponding scene category label;

for each sample image, inputting the sample image into the first sub-model of the machine learning model to obtain at least one sample visual element, inputting the at least one sample visual element into an initial recognition model to obtain a predicted scene category output from the initial recognition model, and calculating a loss value corresponding to the sample image based on the predicted scene category and a scene category label corresponding to the sample image; and determining an average loss value of loss values corresponding to the sample images, adjusting a model parameter of the initial recognition model based on the average loss value, returning to perform an operation of obtaining a s ample image set and iterating training operations until a training stop condition is met, and obtaining the second sub-model of the machine learning model which has completed the training process.

11. The computing device according to claim 10, wherein the inputting the at least one sample visual element into the initial recognition model to obtain the predicted scene category output from the initial recognition model comprises:

encoding the at least one sample visual element in a preset encoding manner to obtain a sample encoding vector of the at least one sample visual element; and inputting the sample encoding vector into the initial recognition model to obtain the predicted scene category output from the initial recognition model.

12. The computing device according to claim 8, wherein the second sub-model of the machine learning model is trained to learn a relationship between different visual elements and generate a scene category in which the different visual elements coexist.

13. The computing device according to claim 8, wherein before inputting the to-be-recognized image into the first sub-model of the machine learning model, and determining at least one target visual element comprised in the to-be-recognized image, the operations further comprise:

obtaining at least one visual element detection model, and obtaining a set of test images;

calculating at least one of a recognition accuracy or a recall rate corresponding to each of the at least one visual element detection model using the set of test images; and selecting the first sub-model of the machine learning model from the at least one visual element detection model based on the at least one of the recognition accuracy or the recall rate.

14. The computing device according to claim 13, wherein the set of test images comprises a plurality of test images, and each test image carries visual element labels; and wherein the calculating the at least one of the recognition accuracy or the recall rate corresponding to each of the at least one visual element detection model using the set of test images comprises:

for each test image, inputting the test image into a reference visual detection model to obtain predicted visual elements output from the reference visual detection model, wherein the reference visual detection model is any one of the at least one visual element detection model; and calculating at least one of a recognition accuracy or a recall rate of the reference visual detection model based on the visual element labels of each test image and corresponding predicted visual elements.

15. A non-transitory computer-readable storage medium, storing computer-executable instructions, wherein when the computer-executable instructions are executed by a processor, the computer-executable instructions cause the processor to implement operations comprising:

obtaining a to-be-recognized image;

inputting the to-be-recognized image into a first sub-model of a machine learning model;

recognizing a plurality of visual elements in the to-be-recognized image by the first sub-model of the machine learning model;

determining related visual elements among the plurality of visual elements by performing semantic analysis on the plurality of visual elements;

clustering the related visual elements to obtain at least one target visual element, each of the at least one target visual element carries an element probability;

encoding the at least one target visual element in a preset encoding manner and generating an encoding vector of the at least one target visual element, wherein encoding the at least one target visual element and generating the encoding vector of the at least one target visual element comprises:

determining a vector length of the encoding vector based on an element quantity of preset visual elements, and determining an encoding value at each encoding position in the encoding vector having the vector length based on the at least one target visual element and the element probability corresponding to each of the at least one target visual element;

inputting the encoding vector of the at least one target visual element into a second sub-model of the machine learning model; and generating a scene category corresponding to the to-be-recognized image by the second sub-model of the machine learning model.

16. The non-transitory computer-readable storage medium according to claim 15, wherein the determining the encoding value at each encoding position in the encoding vector having the vector length based on the at least one target visual element and a corresponding element probability comprises:

determining, with respect to each encoding position in the encoding vector having the vector length, a reference visual element corresponding to the encoding position;

in response to determining that the at least one target visual element comprises the reference visual element, identifying an element probability corresponding to the reference visual element in the at least one target visual element as the encoding value of the encoding position; and in response to determining that the at least one target visual element does not comprise the reference visual element, setting the encoding value of the encoding position to a preset value.

17. The non-transitory computer-readable storage medium according to claim 15, wherein the second sub-model of the machine learning model is trained to learn a relationship between different visual elements and generate a scene category in which the different visual elements coexist.

18. The non-transitory computer-readable storage medium according to claim 15, wherein before inputting the to-be-recognized image into the first sub-model of the machine learning model, and determining at least one target visual element comprised in the to-be-recognized image, the operations further comprise:

obtaining at least one visual element detection model, and obtaining a set of test images;

calculating at least one of a recognition accuracy or a recall rate corresponding to each of the at least one visual element detection model using the set of test images; and selecting the first sub-model of the machine learning model from the at least one visual element detection model based on the at least one of the recognition accuracy or the recall rate.

19. The non-transitory computer-readable storage medium according to claim 18, wherein the set of test images comprises a plurality of test images, and each test image carries visual element labels; and wherein the calculating the at least one of the recognition accuracy or the recall rate corresponding to each of the at least one visual element detection model using the set of test images comprises:

for each test image, inputting the test image into a reference visual detection model to obtain predicted visual elements output from the reference visual detection model, wherein the reference visual detection model is any one of the at least one visual element detection model; and calculating at least one of a recognition accuracy or a recall rate of the reference visual detection model based on the visual element labels of each test image and corresponding predicted visual elements.

20. The non-transitory computer-readable storage medium according to claim 15, wherein the second sub-model of the machine learning model is obtained through a training process comprising:

obtaining a set of sample images, wherein the set of sample images comprises sample images belonging to at least two different scene categories, and each sample image carries a corresponding scene category label;

for each sample image, inputting the sample image into the first sub-model of the machine learning model to obtain at least one sample visual element, inputting the at least one sample visual element into an initial recognition model to obtain a predicted scene category output from the initial recognition model, and calculating a loss value corresponding to the sample image based on the predicted scene category and a scene category label corresponding to the sample image; and determining an average loss value of loss values corresponding to the sample images, adjusting a model parameter of the initial recognition model based on the average loss value, returning to perform an operation of obtaining a sample image set and iterating training operations until a training stop condition is met, and obtaining the second sub-model of the machine learning model which has completed the training process.

* * * * *